United States Patent [19]

Rike

[11] Patent Number: 5,538,105
[45] Date of Patent: Jul. 23, 1996

[54] BRAKE SHOE HOLD DOWN CLIP FOR DISC BRAKE ASSEMBLY

[75] Inventor: Russell E. Rike, Spring Valley, Ohio

[73] Assignee: Dayton Walther Corporation, Dayton, Ohio

[21] Appl. No.: 399,382

[22] Filed: Mar. 7, 1995

[51] Int. Cl.[6] ..................................................... F16D 55/00
[52] U.S. Cl. ...................................... 188/73.32; 188/73.31
[58] Field of Search .............................. 188/73.32, 73.31, 188/73.38, 71.1, 46, 47

[56] References Cited

U.S. PATENT DOCUMENTS

| | | | |
|---|---|---|---|
| 3,561,572 | 2/1971 | Flegl | 188/73.32 |
| 3,783,980 | 1/1974 | Kallmeyer | 188/73.32 |
| 3,899,052 | 8/1975 | Burnett | 188/73.32 |
| 3,930,564 | 1/1976 | Kobayashi | 188/73.32 |

FOREIGN PATENT DOCUMENTS

| | | | |
|---|---|---|---|
| 412541A | 2/1991 | European Pat. Off. | 188/73.31 |

OTHER PUBLICATIONS

Drawing No. 60–450410, Dated May 1987.

*Primary Examiner*—Robert J. Oberleitner
*Assistant Examiner*—C. T. Bartz

*Attorney, Agent, or Firm*—MacMillan, Sobanski & Todd

[57] ABSTRACT

An improved structure for a brake shoe hold down clip adapted for use in a disc brake assembly includes a caliper provided with at least one recess formed therein. A piston is slidably disposed in the recess, and a pair of brake shoes are carried by the disc brake assembly and disposed on opposite axial sides of an associated rotor. Each of said brake shoes includes a backing plate and a friction pad. An actuation system is carried by the caliper for selectively moving the brake shoes between a non-braking position, wherein each of the friction pads is spaced apart from the adjacent side of the rotor, and a braking position, wherein said each of the friction pads frictionally engages the adjacent side of the rotor. The brake shoe hold down clip includes a central mounting portion and a pair of end arms extending generally parallel to the central mounting portion from opposite sides thereof. The end arms are connected to the central mounting portion by a pair of spaced apart arms extending generally perpendicular relative thereto. The central mounting portion includes a first end slidably disposed in an opening provided on a portion of the caliper, and a second opposite end having an aperture formed therein for receiving a fastener to releasably secure the brake shoe hold down clip to the caliper whereby the end arms of the brake shoe hold down clip are operative to engage the backing plates of the brake shoes to prevent radial movement of the brake shoes.

9 Claims, 6 Drawing Sheets

5,538,105

BRAKE SHOE HOLD DOWN CLIP FOR DISC BRAKE ASSEMBLY

BACKGROUND OF THE INVENTION

This invention relates in general to vehicle disc brake assemblies and in particular to an improved structure for a brake shoe hold down clip adapted for use in such a vehicle disc brake assembly.

Most vehicles are equipped with a brake system for retarding or stopping movement of the vehicle in a controlled manner. A typical brake system for an automobile and light duty truck includes a disc brake assembly for the front wheels of the vehicle, and either a disc brake assembly or a drum brake assembly for the rear wheels of the vehicle. A typical brake system for a medium duty truck includes a disc brake assembly on all four wheels of the vehicle. The brake assemblies are typically actuated by hydraulic or pneumatic pressure generated when an operator of the vehicle depresses a brake pedal. The structures of the disc brake assembly, as well as the actuators therefor, are well known in the art.

There are two basic types of calipers for use in disc brake assemblies, namely, a "floating" caliper disc brake assembly, and a "fixed" caliper disc brake assembly. A floating caliper type of disc brake assembly is usually used on automobiles and light and medium duty trucks. A conventional floating caliper type of disc brake assembly includes a brake caliper which is supported by a pair of pins for sliding movement relative to an anchor plate which is secured to a fixed, non-rotatable component of the vehicle. A fixed caliper type of disc brake assembly is sometimes used automobiles and light and medium duty trucks. A conventional fixed caliper type of disc brake assembly includes a brake caliper which is solidly fixed to a fixed, non-rotatable component of the vehicle.

In both types of disc brake assemblies, a pair of brake shoes are supported by the disc brake assembly for sliding movement relative thereto. The brake shoes have respective friction pads which are disposed on opposite sides of a rotor. The rotor, in turn, is connected to the wheel of the vehicle for rotation therewith. To effect braking action, the brake shoes are moved inwardly toward one another so as to frictionally engage the opposed sides of the rotor. Such frictional engagement causes retarding or stopping of the rotational movement of the rotor and, therefore, the wheel of the vehicle in a controlled manner.

To accomplish this in a fixed caliper type of disc brake assembly, the brake caliper assembly includes an inboard caliper assembly disposed adjacent an inboard brake shoe, and an outboard caliper assembly disposed adjacent an outboard brake shoe. One or more hydraulically or pneumatically actuated pistons are provided in respective cylindrical recesses formed in the inboard caliper assembly adjacent the inboard brake shoe, and one or more hydraulically or pneumatically actuated pistons are provided in respective cylindrical recesses formed in the outboard caliper assembly adjacent the outboard brake shoe. This type of construction is commonly referred to as an "opposed" piston caliper design. When the brake pedal is depressed, the pistons urge the brake shoes toward one another and into engagement with the associated side of the rotor. As result, the brake shoes frictionally engage the opposed sides of the rotor.

Repeated usage of the disc brake assembly causes the associated brake shoes to wear and become increasingly thinner. When sufficient wear occurs, the brake shoes should be removed and replaced with a new pair of brake shoes. Typically, the construction of a fixed caliper type of disc brake assembly allows the worn brake shoes to be lifted upwardly out of the assembly and replaced with a new pair of brake shoes. However, due to the construction, the disc brake assembly includes a brake shoe hold down clip releasably attached thereto for the purpose of retaining the brake shoes on a pair of guide rails of the disc brake assembly. The brake shoe hold down clip is typically attached by a pair of bolts which secure opposed sides of the hold down clip to respective portions of the inboard caliper assembly and the outboard caliper assembly. Thus, it would be desirable to provide an improved structure for a brake shoe hold down mechanism which is readily attached and removed from the associated disc brake assembly.

SUMMARY OF THE INVENTION

This invention relates to an improved structure for a brake shoe hold down clip adapted for use in a disc brake assembly which is readily attached and removed therefrom. In particular, the disc brake assembly includes a caliper provided with at least one recess formed therein. A piston is slidably disposed in the recess, and a pair of brake shoes are carded by the disc brake assembly and disposed on opposite axial sides of an associated rotor. Each of said brake shoes includes a backing plate and a friction pad. An actuation system is carded by the caliper for selectively moving the brake shoes between a non-braking position, wherein each of the friction pads is spaced apart from the adjacent side of the rotor, and a braking position, wherein said each of the friction pads frictionally engages the adjacent side of the rotor. The brake shoe hold down clip includes a central mounting portion and a pair of end arms extending generally parallel to the central mounting portion from opposite sides thereof. The end arms are connected to the central mounting portion by a pair of space apart arms extending generally perpendicular relative thereto. The central mounting portion includes a first end slidably disposed in an opening provided on a portion of the caliper, and a second opposite end having an aperture formed therein for receiving a fastener to secure the brake shoe hold down clip to the caliper whereby the end arms of the hold down clip are operative to engage the backing plates of the brake shoes to prevent radial movement of the brake shoes.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
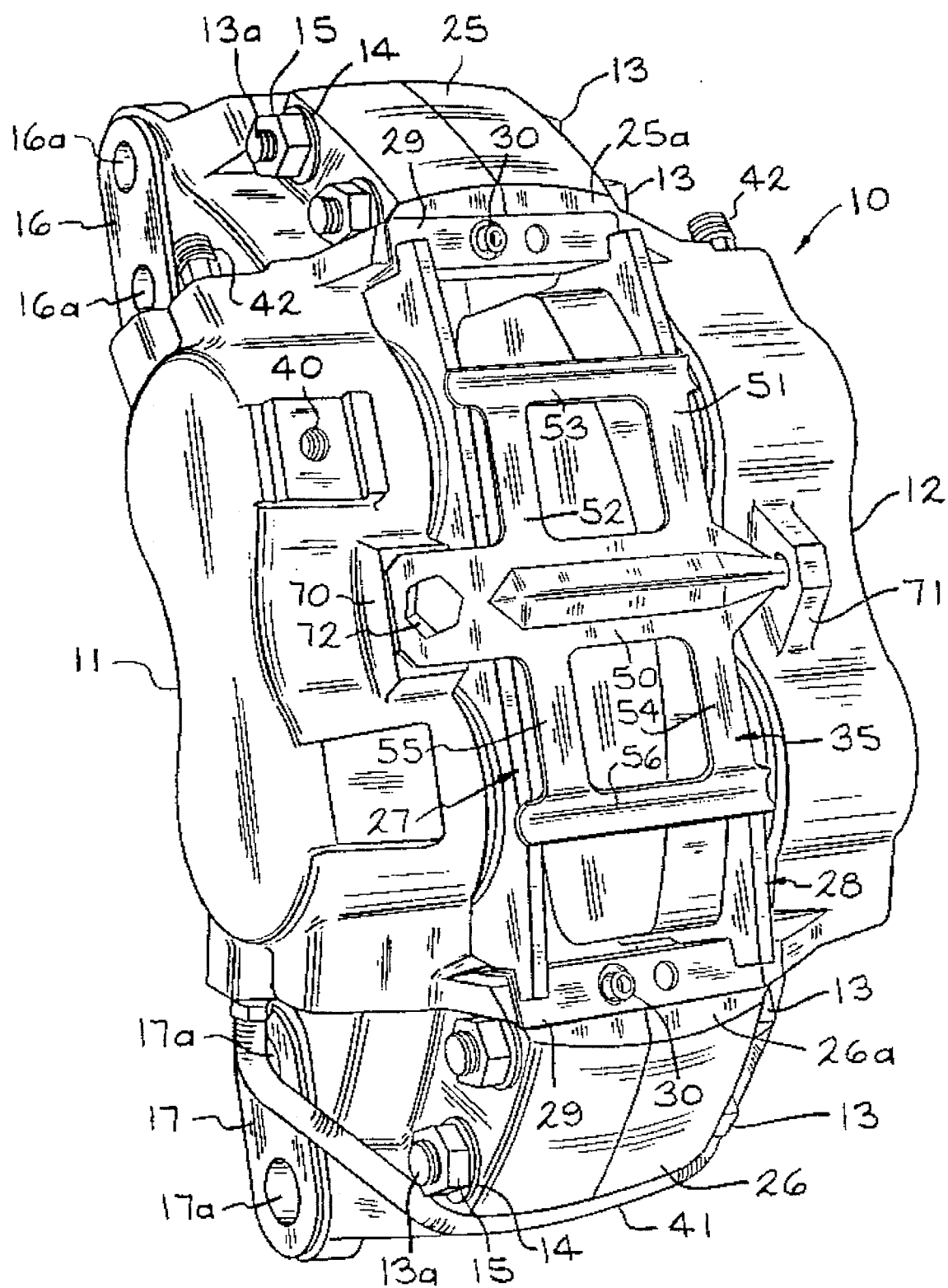
FIG. 1 is a perspective view of a portion of a vehicle disc brake assembly including an improved brake shoe hold down clip in accordance with this invention.
Figure 2:
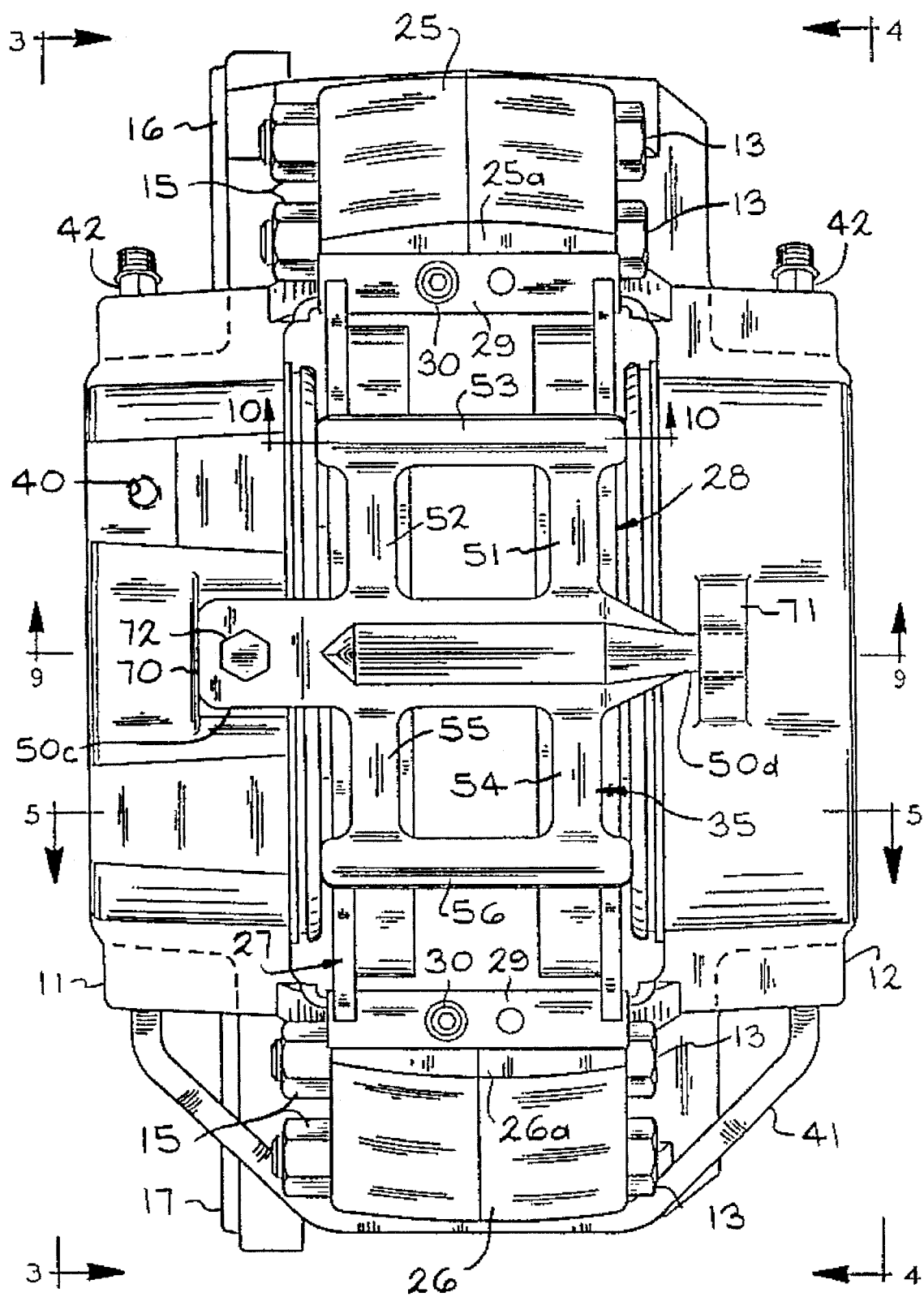
FIG. 2 is a top plan view of the disc brake assembly illustrated in FIG. 1.

Referring now to the drawings, there is illustrated in FIGS. 1 and 2 a vehicle disc brake assembly, indicated generally at 10, and constructed in accordance with the present invention. The general structure and operation of the disc brake assembly 10 is conventional in the art. Thus, only those portions of the disc brake assembly 10 which are necessary for a full understanding of this invention will be explained and illustrated.

Figure 3:
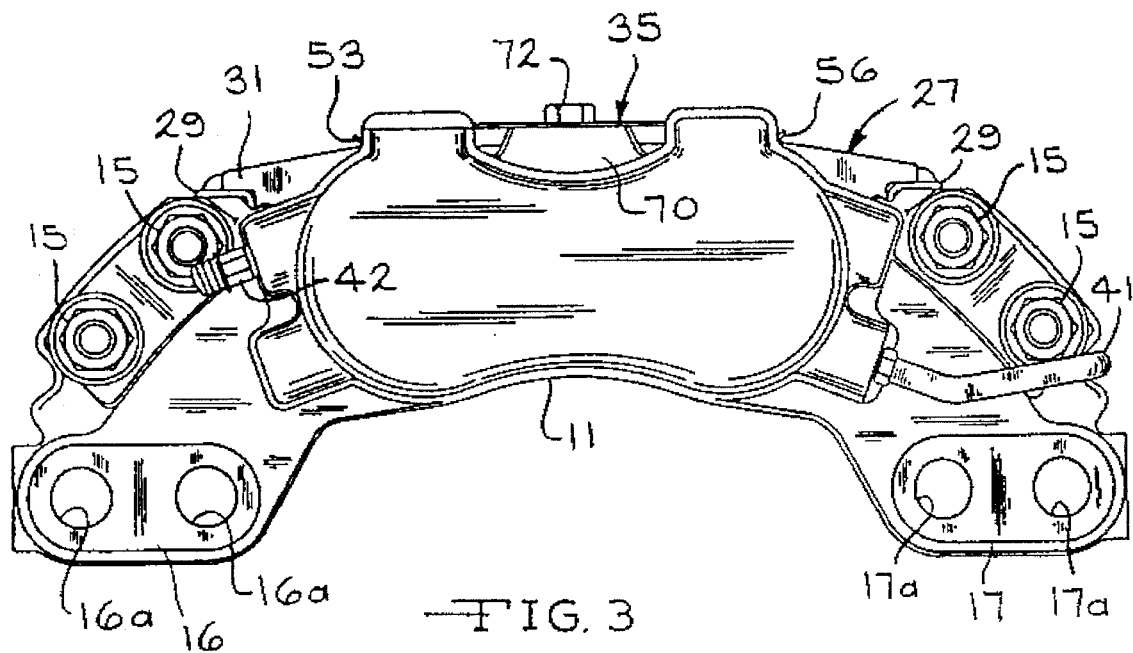
FIG. 3 is an elevational view of the disc brake assembly taken along line 3—3 of FIG. 2.
Figure 4:
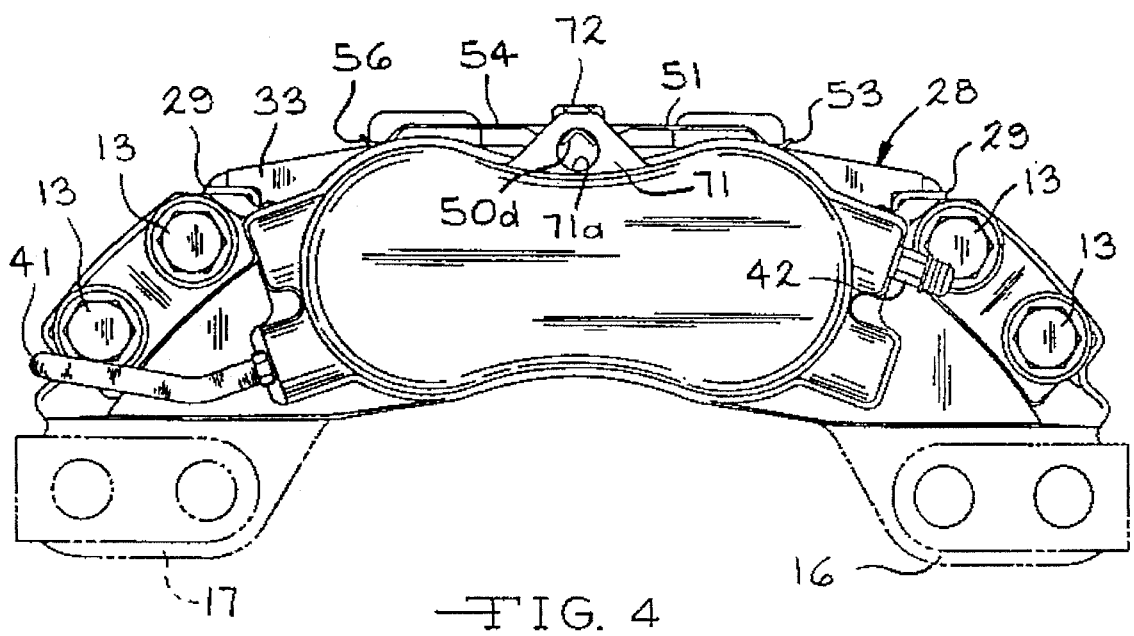
FIG. 4 is an elevational view of the disc brake assembly taken along line 4—4 of FIG. 2.

The illustrated disc brake assembly is an opposed four piston fixed caliper type of disc brake assembly, and is associated with a right wheel of a vehicle. The disc brake assembly 10 is a two-piece construction, and includes an inboard brake caliper assembly 11, best shown in FIG. 3, and an outboard brake caliper assembly 12, best shown in FIG. 4. The construction of the inboard caliper assembly 11 and the outboard caliper assembly 12 are generally similar to one another, and like reference numbers will be used for corresponding parts. Alternatively, the inboard caliper assembly 11 and the outboard caliper assembly 12 may be integrally formed.

The inboard brake caliper assembly 11 and the outboard brake caliper assembly 12 are provided with respective pairs of aligned apertures formed therethrough. Threaded bolts 13 extend through the respective pairs of apertures, and washers 14 and nuts 15 are installed on threaded ends 13a of the bolts 13 to secure the inboard caliper assembly 11 to the outboard caliper assembly 12.

The inboard caliper assembly 11 includes a pair of anchoring arms 16 and 17 provided at opposed ends thereof. Each of the arms 16 and 17 are provided with a pair of apertures 16a and 17a, respectively, formed therethrough, and are adapted to receive bolts (not shown) for securing the inboard caliper assembly 11, and therefore the assembled disc brake assembly 10, to a fixed, non-rotatable component of the vehicle, such as an axle flange (when the disc brake assembly is installed for use on the rear of the vehicle), or a steering knuckle (when the disc brake assembly is installed for use on the front of the vehicle).

Figure 5:
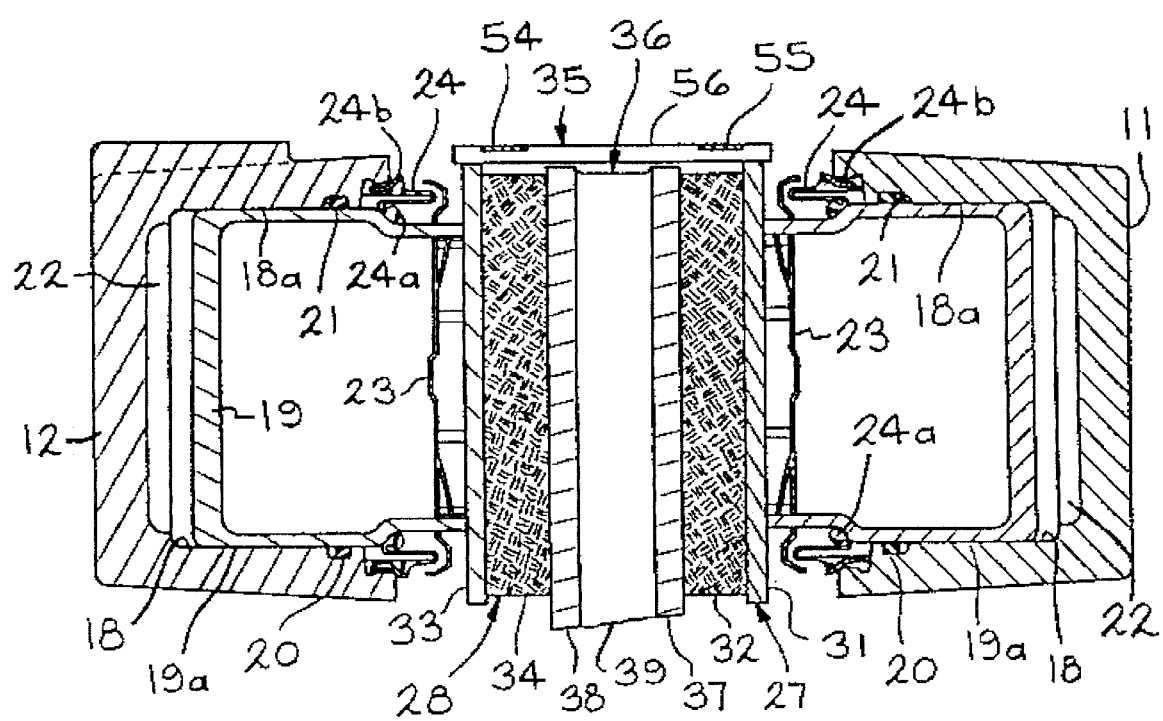
FIG. 5 is a cross-sectional view taken along line 5—5 of FIG. 2.
Figure 6:
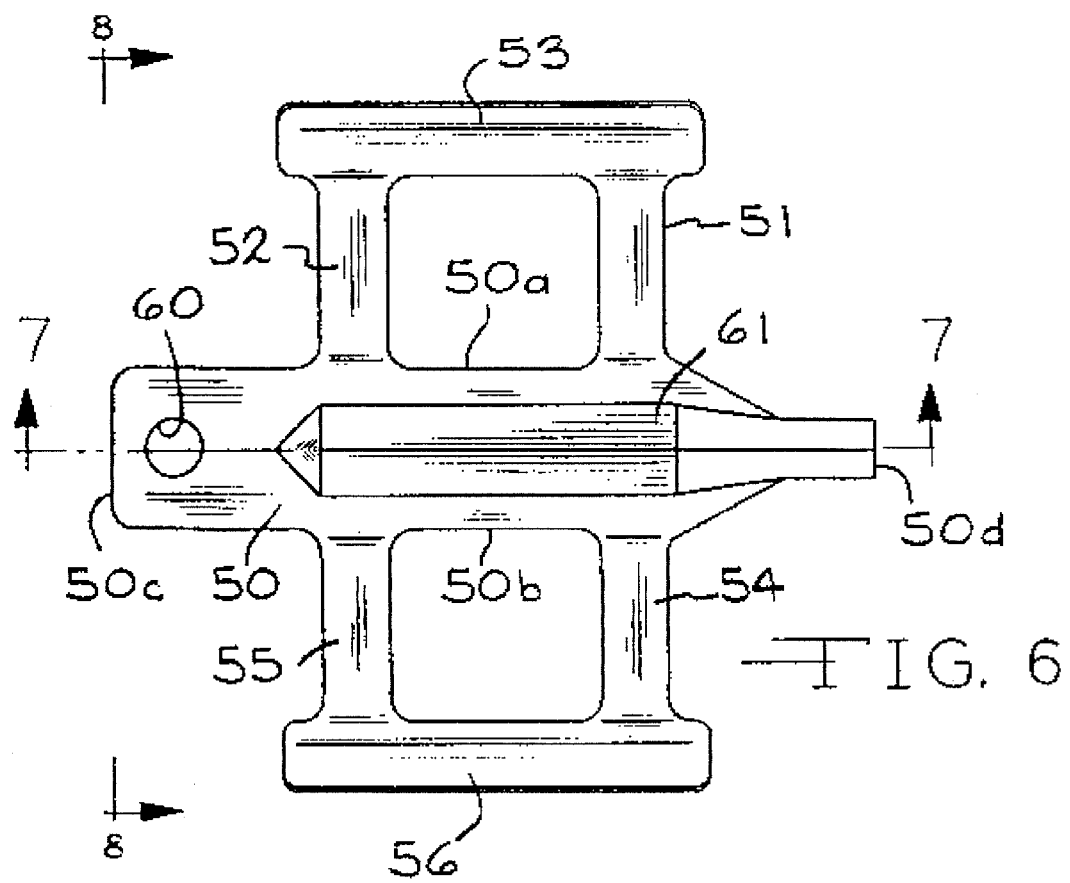
FIG. 6 is a top plan view of the brake shoe hold down clip.
Figure 7:
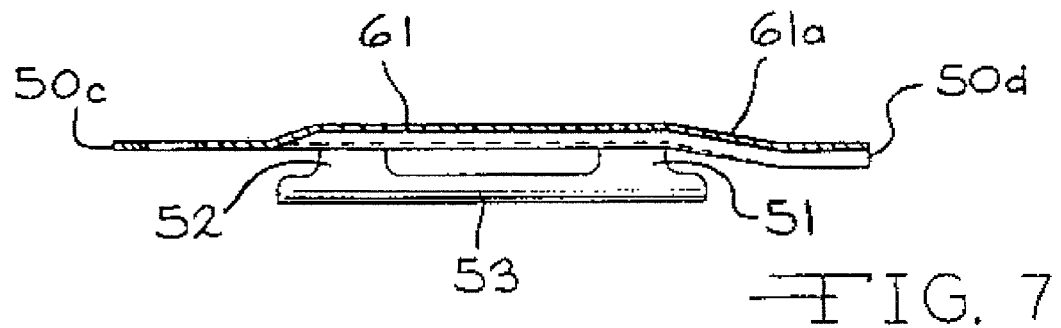
FIG. 7 is a cross-sectional view taken along line 7—7 of FIG. 6.
Figure 8:
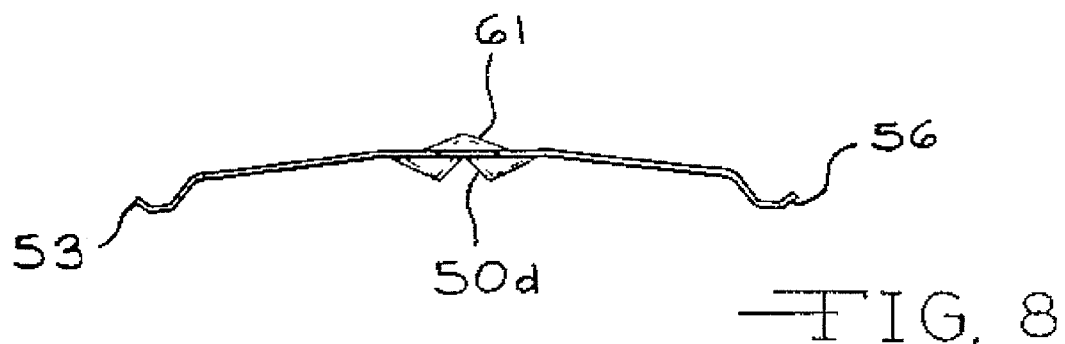
FIG. 8 is a cross-sectional view taken along line 8—8 of FIG. 6.

The illustrated inboard caliper assembly 11 includes a pair of cylindrical recesses 18 formed therein, only one recess 18 is shown in FIG. 5. Similarly, the outboard caliper assembly 12 includes a pair of cylindrical recesses 18 formed therein, only one recess 18 is shown in FIG. 5. A piston 19 is disposed in each of the cylindrical recesses 18, and a fluid seal 20 is disposed in an annular groove 21 formed in a side wall 18a of the cylindrical recess 18, and engages an outer side wall 19a of the piston 19. The fluid seal 20 is provided to define a sealed hydraulic actuator chamber 22, within which the piston 19 is disposed for sliding movement.

In particular, the inboard caliper assembly 11 includes a pair of hydraulic actuator chambers 22 which are connected together by a fluid passageway (not shown) formed therein. Similarly, the outboard caliper assembly 12 includes a pair of hydraulic actuator chambers 22 which are connected together by a fluid passageway (not shown) formed therein. Also, the fluid seal 20 is designed to function as a roll-back seal which retracts the piston 19 within the cylindrical recess 18 when the disc brake assembly 10 is not actuated. Thus, it will be appreciated that the illustrated brake actuating means is a hydraulic actuating means. However, other well known types of actuating means, such as pneumatic, electrical, and mechanical, can be used. Also, a heat shield 23 is preferably provided adjacent an outboard end of each of the pistons 19.

A dust boot seal 24 is provided about the outboard end of the piston 19 to prevent water, dirt, and other contaminants from entering into the cylindrical recess 18. The dust boot seal 24 is formed from a flexible material and has a first end 24a which engages the outer side wall 19a of the piston 19 and a second end 24b which engages an annular recess formed adjacent the open ends of the associated cylindrical recesses 18. A plurality of flexible convolutions are provided in the dust boot seal 24 between the first and second ends thereof to accommodate movement of the pistons 19 within each of the respective cylindrical recesses 18.

The disc brake assembly 10 includes a pair of arms 25 and 26 having respective guide rails 25a and 26a formed thereon. The guide rails 25 and 26 extend transverse to the arms 25 and 26, and extend parallel to one another. As will be discussed, a pair of brake shoes 27 and 28 are supported on the guide rails 25a and 26a for sliding movement relative thereto. Preferably, a hardened replaceable insert 29 is secured to each of the guide rail 25 and 26 by a fastener 30. The inserts 29 are preferably formed from stainless steel, and provide a smooth, corrosion resistant sliding surface for the brake shoes 27 and 28.

The inboard brake shoe 27 includes a backing plate 31 having a friction pad 32 secured thereto. Similarly, the outboard brake shoe 28 includes a backing plate 33 having a friction pad 34 secured thereto. As will be discussed below, a brake shoe hold down clip 35 is releasably attached to the disc brake assembly 10 to bias opposed ends of backing plates 31 and 33 of the brake shoes 27 and 28 against the guide rails 25a and 26a.

As shown in FIG. 5, the brake shoes 27 and 28 are disposed on opposite sides of a rotor 36. The rotor 36 is generally flat and circular in shape and is secured in a conventional manner to a rotatable wheel (not shown) of the vehicle. The illustrated rotor 36 includes a pair of opposed braking discs 37 and 38 which are spaced apart from one another by a plurality of intermediate vanes 39 in a known manner.

When it is desired to actuate the disc brake assembly 10 to retard or stop the rotation of the brake rotor 36 and the vehicle wheel associated therewith, the driver of the vehicle depresses the brake pedal (not shown). In a manner which is well known in the art, the depression of the brake pedal causes pressurized hydraulic fluid to be introduced into the disc brake assembly via a threaded inlet port 40 provided in the inboard caliper assembly 11. The inlet port 40 is connected through a brake line (not shown) to a master cylinder (not shown) of the vehicle brake system. The brake line is attached to the inlet port 40 by a threaded fitting (not shown). The fluid flows from the inlet port 40 into the inboard fluid chambers 22 to urge the associated pistons 19 in the inboard caliper assembly 11 in the outboard direction (toward the left when viewing FIG. 5) into engagement with the backing plate 31 of the inboard brake shoe 27.

The fluid chambers 22 of the inboard caliper assembly 11 are connected to the fluid chambers 22 of the outboard caliper assembly 12 by a fluid supply assembly 41. Thus, at the same time, the fluid flows through the fluid supply assembly 41 into the outboard fluid chambers 22 to urge the associated pistons 19 in the outboard caliper assembly 12 in the inboard direction (toward the left when viewing FIG. 5) into engagement with the backing plate 33 of the outboard brake shoe 28. As a result, the friction pad 32 of the inboard brake shoe 27 is moved into frictional engagement with the inboard braking disc 37 of the rotor 36, and the friction pad 34 of the outboard brake shoe 28 is simultaneously moved into frictional engagement with the outboard braking disc 38 of the brake rotor 36. As a result, the rotor 36 is frictionally engaged by the friction pads 32 and 34 to retard relative rotational movement thereof.

The disc brake assembly further includes a pair of bleeder screws 42 which are received in a threaded aperture provided in each of the inboard caliper assembly 11 and the outboard caliper assembly 12. The bleeder screws 42 are provided to bleed air from the associated fluid chambers 22 when the disc brake assembly 10 is initially connected to the vehicle hydraulic brake system.

Turning now to FIGS. 6–9, the construction of the brake shoe hold down clip 35 will be discussed. The hold down clip 35 is preferably stamped from a flat strip of SAE 1074 carbon steel. However, other materials, such as for example brass, or stainless steel can be used. The brake shoe hold down clip 35 is generally arcuate shaped, and is formed having a longitudinally extending central mounting portion 50. A first pair of opposed spaced apart arms 51 and 52 extend perpendicular to and outwardly from one side 50a of the central mounting portion 50. The ends of the first pair of arms 51 and 52 terminate at and are interconnected by a first end arm 53 which extends generally parallel to the central mounting portion 50.

The brake shoe hold down clip 35 further includes a second pair of spaced apart arms 54 and 55 extend perpendicular to and outwardly from the opposite side 50b of the central mounting portion 50. The ends of the second pair of arms 54 and 55 terminate at and are interconnected by a second end arm 56 which extends generally parallel to the central mounting portion 50. In the illustrated embodiment, the first pair of arms 51 and 52 are identical to the second pair of arms 54 and 55, respectively, and the first and second end arms 53 and 56 are identical to one another and are generally U-shaped. Alternatively, the first and second arms 53 and 56 may be connected to the central mounting portion 50 by other means.

The central mounting portion 50 further includes an aperture 60 formed adjacent one end 50c thereof, and a raised, generally inverted V-shaped strengthening rib 61 which extends substantially the entire length thereof and terminates at an opposite V-shaped end 50d. The rib 61 includes a radially downwardly extending portion 60a shown in FIG. 5, to offset the end 50d relative to the end 50c. The purposes for the aperture 60 and the V-shaped end 50d will be explained below.

The brake shoe hold down clip 35 is releasably attached to the disc brake assembly 10 to bias the opposed ends of the backing plates 31 and 33 of the shoes 27 and 28, respectively, against the guide rails 25 and 26, and to allow the brake shoes 27 and 28 to be easily replaced when required. To accomplish this, the inboard caliper assembly 11 includes a raised mounting pad 70, and the outboard caliper assembly 12 includes a raised mounting pad 71. The raised mounting pad 70 is provided with a threaded opening 70a (shown in 9) formed therein, and the raised mounting pad 71 is provided with an aperture 71 a formed therethrough.

The brake shoe hold down clip 35 is supported and secured to the disc brake assembly in the following manner. First, the end 50d of the central mounting portion 50 is inserted into the aperture 71a provided in the raised mounting pad 71 of the outboard caliper assembly 12. Then, the aperture 60 in the central mounting portion 50 is positioned over the threaded aperture 70a provided in the mounting pad 70 of the inboard caliper assembly 11. In the illustrated embodiment, a bolt 72 having a threaded end 72a extends through the aperture 60 and is threadably received in aperture 70a to secure the brake shoe hold down clip 35 on the disc brake assembly 10. Alternatively, other means may be used to attach the brake shoe hold down clip 35 to the disc brake assembly.

Figure 9:
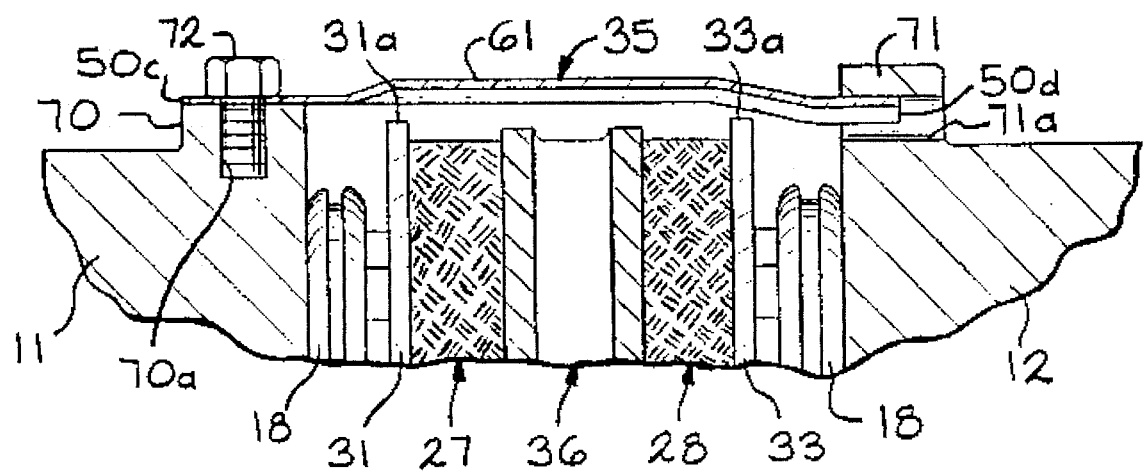
FIG. 9 is a partial cross-sectional view taken along line 9—9 of FIG. 2.
Figure 10:
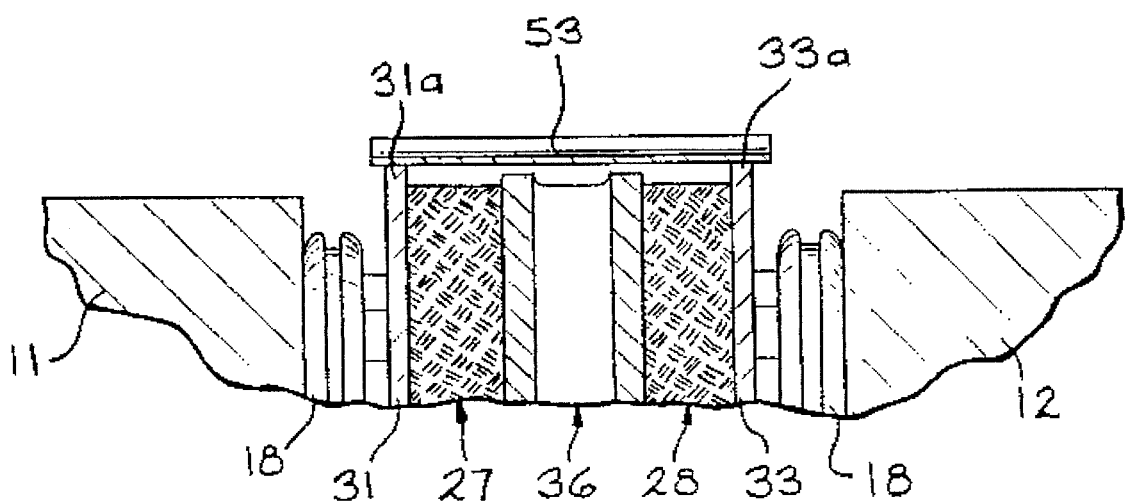
FIG. 10 is a partial cross-sectional view taken along line 10—10 of FIG. 2.

In the illustrated embodiment, once the brake shoe hold down clip 35 is installed, the first end arm 53 of the brake shoe hold down clip 35 engages upper surfaces 31a and 33a of both of the backing plates 31 and 33, respectively, of brake shoes 27 and 28, as shown in FIG. 9. This engagement is effective to bias the associated ends of the backing plates 31 and 33 against the guide rail 25a. Similarly, the second end arm 56 of the brake shoe hold down clip 35 engages the upper surfaces 31a and 33a of the opposite ends of both of the backing plates 31 and 33, respectively, of brake shoes 27 and 28. This engagement is effective to bias the associated ends of the backing plates 31 and 33 against the guide rail 26a.

In particular, the first and second end arms 53 and 56, respectively, of the brake shoe hold down clip 35 are effective to exert a predetermined magnitude of force against the upper surfaces 31a and 33a the backing plates 31 and 33, respectively, of the brake shoes 27 and 28, to prevent radial movement of the brake shoes 27 and 28 relative to the guide rails 25a and 26a. However, the force applied by the first and second end arms 53 and 56 of the brake shoe hold down clip 35 allow the brake shoes 27 and 28 to move axially along the guide rails 25a and 26a toward one another when the disc brake assembly 10 is actuated.

Preferably, as shown in FIG. 9, the central mounting portion 50 of the brake shoe hold down clip 35 is spaced apart from the upper surfaces 31 a and 33a of the backing plates 31 and 33, respectively, of the brake shoes 27 and 28. Alternatively, the central mounting portion 50 may apply a force against the upper surfaces 31a and 33a of the backing plates 31 and 33, respectively, of the brake shoes 27 and 28.

During repeated usage of the disc brake assembly, the friction pads 32 and 34 of the brake shoes 27 and 28, respectively, wear and become increasingly thinner. When sufficient wear occurs, the brake shoes 27 and 28 should be removed and replaced with a new pair of brake shoes. To accomplish this, the bolt 72 is removed so that the end 50d of the central mounting portion 50 of the hold down clip 35 may be removed from the aperture 71a of the mounting pad 71. Once the brake shoe hold down clip 35 is removed, the brake shoes 27 and 28 are lifted upwardly out of the disc brake assembly 10 and a new pair of brake shoes are installed. The brake shoe hold down clip 35 is reinstalled on the disc brake assembly 10 as described above.

It will be appreciated that while the present invention has been described and illustrated in conjunction with the particular vehicle disc brake assembly disclosed herein, the invention may be used in conjunction with other disc brake assemblies. For example, the invention may be used in conjunction with a sliding caliper type of disc brake assembly.

In accordance with the provisions of the patents statues, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A disc brake assembly adapted to selectively frictionally engage a rotor connected to a vehicle wheel comprising:

a caliper having first and second mounting pads formed thereon, said first mounting pad having a first mounting pad opening formed therein, said second mounting pad having a second mounting pad aperture formed therein;

a pair of brake shoes carried on said caliper and adapted to be disposed on opposite axial sides of the rotor;

means for selectively moving said brake shoes axially toward and away from one another so as to selectively frictionally engage the rotor;

a brake shoe hold down clip for preventing radial movement of said brake shoes, said brake shoe hold down clip including a central mounting portion and a pair of end arms extending from said central mounting portion into engagement with said brake shoes to prevent radial movement thereof, said central mounting portion including a first end having a first end aperture formed therethrough which is aligned with said first mounting pad opening, said central mounting portion further including a second end which extends through said second mounting pad aperture so as to be retained therein; and a fastener extending through said first end aperture of said central mounting portion into engagement with said first mounting pad opening formed in said caliper to secure said brake shoe hold down clip to said caliper.

2. The disc brake assembly defined in claim 1 wherein said first mounting pad opening is threaded, and said fastener is a threaded fastener which extends into threaded engagement with said threaded first mounting pad opening.

3. The disc brake assembly defined in claim 1 wherein the disc brake assembly is a fixed caliper type of disc brake assembly.

4. The disc brake assembly defined in claim 1 wherein the disc brake assembly is a floating caliper type of disc brake assembly.

5. The disc brake assembly defined in claim 1 wherein said end arms of said brake shoe hold down clip are generally U-shaped.

6. The disc brake assembly defined in claim 1 wherein said central mounting portion includes a strengthening rib extending between said first and second ends thereof.

7. The disc brake assembly defined in claim 1 wherein only said end arms of said brake shoe hold down clip engage said brake shoes to prevent radial movement thereof.

8. The disc brake assembly defined in claim 1 wherein said brake shoe hold down clip is generally arcuate shaped and is formed from steel.

9. The disc brake assembly defined in claim 1 wherein said second end of said central mounting portion is offset relative to said first end of said central mounting portion.

* * * * *